Dec. 27, 1949     A. J. KENDALL     2,492,482
SPECIAL TYPE VALVE STEM DISLODGING TOOL
Filed Oct. 23, 1946
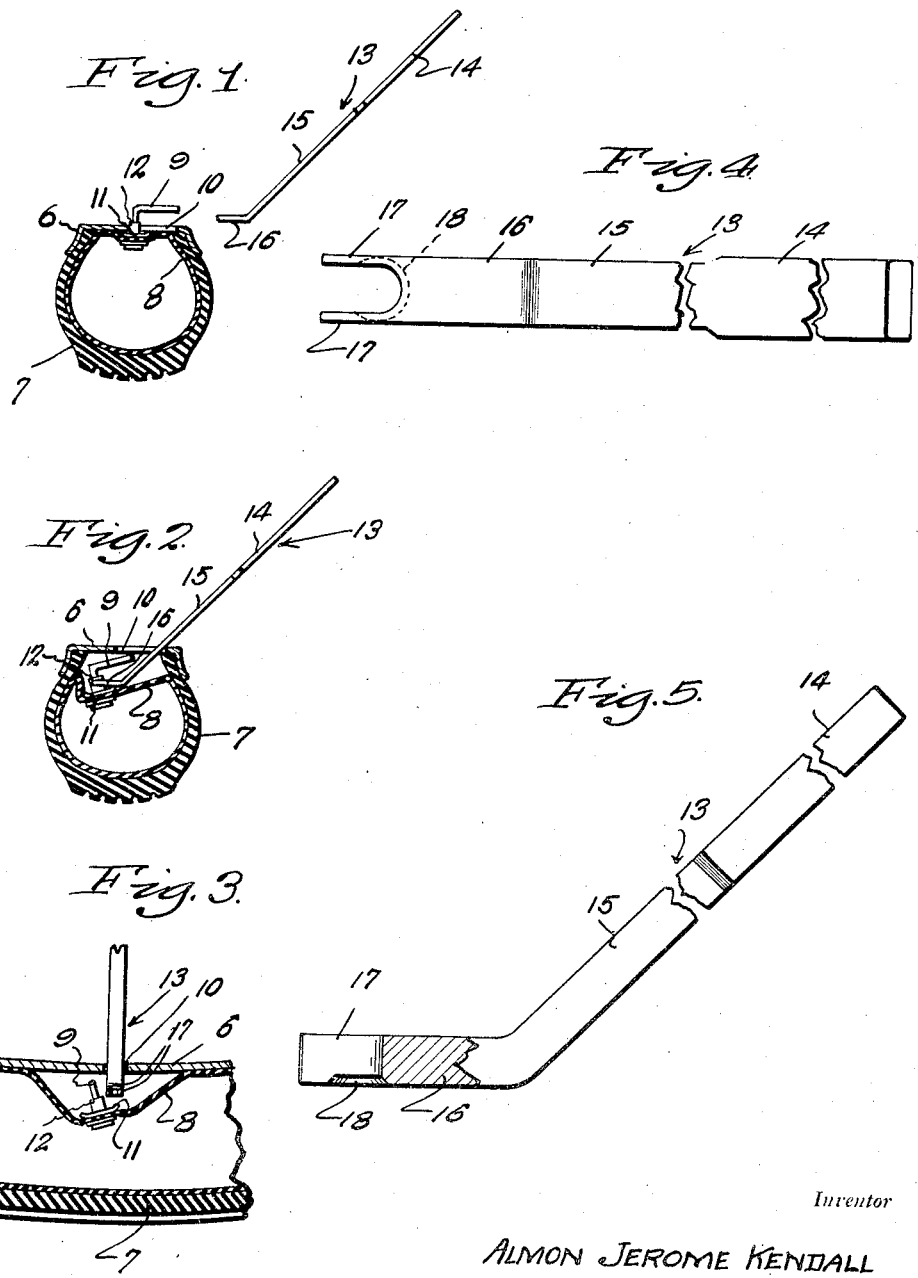
Inventor
ALMON JEROME KENDALL
By Clarence A. O'Brien
and Harvey B. Jacobson
Attorneys Patented Dec. 27, 1949

2,492,482

UNITED STATES PATENT OFFICE 2,492,482

SPECIAL TYPE VALVE STEM DISLODGING TOOL

Almon Jerome Kendall, Atlanta, Ga.

Application October 23, 1946, Serial No. 705,002

2 Claims. (Cl. 81—3)

1

The present invention relates to a novel and practical valve stem tool, the latter being of a special type in that it is expressly designed for a predetermined and particular purpose consisting in dislodging and displacing a so-called offset valve stem from the valve stem slot in either a wheel-rim or tire rim during the interval of dismounting a tire for repair and replacement purposes.

The obvious object of the invention is to provide a simple and expedient highly economical tool which is aptly designed and suitable to quickly engage a portion of an offset or L-shaped valve stem, this in a manner to push said valve stem down and into the rim opening and then into the tire casing, thus to promote safe and quick demounting of the tire.

It is a matter of common knowledge that inner-tube valve stems get rusty and are sometimes so securely lodged in the opening of the co-acting rim as to set up immediate difficulties upon setting out to demount a pneumatic tire. I am aware, of course, that tools and implements have been provided to assist in releasing an air valve from the rim in automobile tire and wheel structures. As a matter of fact, I am familiar with a patent to E. Quinn, 1,421,987 showing a tool comprising a shank with a hand-grip at one end and jaw means at the other end for engaging the inner-tube air valve or stem. It is to be noted, however, that in Quinn the construction is such that it is necessary to approach the rim at approximate right angles and to thrust the tool through the valve stem opening in somewhat the same angular relationship. Such a tool is not satisfactorily operable in connection with present day offset or L-shaped valve stems. It follows therefore that in carrying out the principles of the instant invention I have evolved and produced a simple and feasible tool characterized by valve stem engaging means including jaws to straddle a part of a valve structure, said means being on a handle included shank which is arranged at an approximate 135 degree angle, whereby to allow proper insertion and fulcruming results and to achieve desired ends with the least possible difficulties, and to also save time.

Other objects, features and advantages will become more readily apparent from the following description and the accompanying illustrative drawings.

In the drawings, wherein like numerals are employed to designate like parts throughout the views:

Figure 1 is a cross-section through a conventional pneumatic tire, tube, rim and valve stem assembly showing, to the right, the improved valve stem dislodging and displacing tool, Figure 2 is a view based on Figure 1 showing the tool in use and particularly bringing out the manner in which the jaws straddle the base of the valve stem fitting, the tool being pushed into the tire casing at this stage, Figure 3 is a view at right angles to Figure 2, said view serving to bring out the lateral or "side kicked" position of the valve stem to facilitate releasing and removal of the tool, Figure 4 is a top plan view of the tool per se on a larger scale, and Figure 5 is a view in side elevation with a portion broken away and shown in section and also showing to better advantage the intimate conformation of the jaw parts of the tool with parts of the valve stem construction.

Referring now to the drawings, the numeral 6 designates a conventional rim in which a customary tire casing 7 is mounted, said tire casing and rim enclosing an inner-tube 8, the inner-tube being provided with an L-shaped or offset valve stem 9 cooperable with an accommodation slot 10 in the web of the rim. The valve stem means includes the usual anchoring and reinforcing fitting 11 having an enlarged cylindrical member 12. No claim is made to the parts so far detailed.

As before indicated, the novelty with which I am concerned has to do with the valve tool, the part denoted generally by the numeral 13. This comprises a one-piece body fashioned to provide a hand-grip or handle 14 and shank 15 adjoining, at somewhat obtuse angles, a foot 16. The foot has its toe portion bifurcated, the furcations being indicated at 17 and functioning as jaws. The jaws at their inward ends define a rounded crotch and are obviously adapted to straddle the valve stem fitting, particularly the part 12 thereof. The underside of said foot is provided with a substantially C-shaped recess which is in communication with said crotch and which lends itself to proper accommodation of the member 11 of the fitting. Specifically the shank and handle occupy a position which is approximately 135 degrees to the jaw equipped foot. The parts thus shaped and co-acting with one another provide the desired features of accommodation, leverage and fulcruming believed to be sufficient to meet the needs and requirements of the user. The jaw incorporated foot is just at the right angle to the axis of the handle to permit said foot to be slipped in and under the L-shaped valve stem and then pressed down through the valve stem opening 10, whereby to firmly straddle the part 11 of the fitting and to rest adequately, in end thrust relation against the remaining part 11 of said fitting. Hence in case the fitting is rusted and difficult to depress, this intimate conformation and co-action of parts enables the user to obtain satisfactory results with expediency. Although quite simple in form and styling, the tool lends itself admirably well to the steps and procedure necessarily followed in achieving the ends sought.

In the foregoing it will be clear that I have evolved and produced a tool which is feasible, practicable and readily susceptible, because of shape and choice of features and parts to fulfill the requirements of suitability of use and efficient performance. With this tool, the user is insured of accessibility and therefore unhampered approach and usefulness, there being no tool on the market, known to me, which will work successfully in connection with an L-shaped valve stem and its tube connection.

The novelty of the construction of the special type valve stem tool does not injure valve stem or innertube, nor the threads on the valve stem, as it does not come in contact with the end of the valve stem. Thus, a great savings can be anticipated on replacements of valve stems and tubes.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. A one-piece valve stem dislodging tool of the class described comprising a shank and handle, a lateral foot rigidly attached to one end of this shank and disposed at an angle obtuse to the longitudinal axis of the shank and handle, said foot being free of external projections, rectangular in cross-section, and bifurcated to provide a pair of valve stem embracing jaws and an intervening crotch at the inner end portions of said jaws, the underside of said foot having a C-shaped recess in communication with said crotch.

2. A one-piece valve stem tool for use in association with an L-shaped valve stem and the fitting which connects said stem with an inner tube comprising a handle equipped shank provided at its valve stem engaging end with a lateral foot, said foot being bifurcated and the furcations thus produced providing a pair of jaws and an intervening crotch, said jaws being adapted to straddle said valve stem, the under-face of said foot being recessed and said recess being in communication with said crotch.

ALMON JEROME KENDALL.

REFERENCES CITED

The following references are of record in the file of this patent:

UNITED STATES PATENTS

| Number | Name | Date |
| --- | --- | --- |
| 1,421,987 | Quinn | July 4, 1922 |
| 1,686,640 | Pierce, Jr. | Oct. 9, 1928 |
| 2,193,458 | Koenig | Mar. 12, 1940 |